July 24, 1928.
R. KLEIN
PHOTOGRAPHIC SHUTTER
Filed Aug. 11, 1921
1,678,119
5 Sheets-Sheet 1
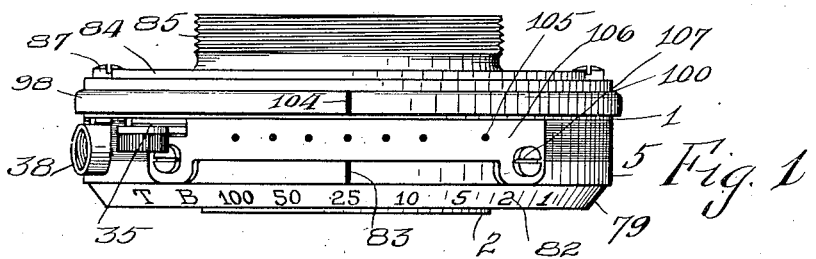
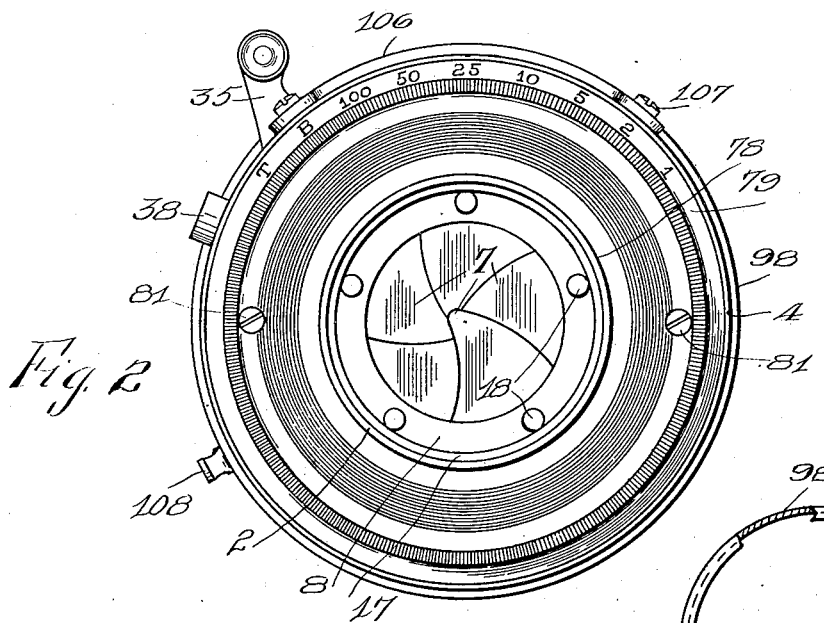
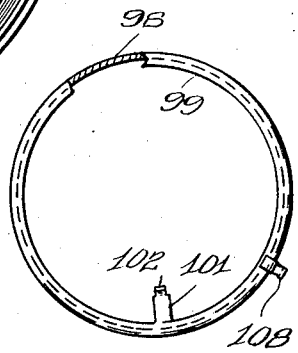
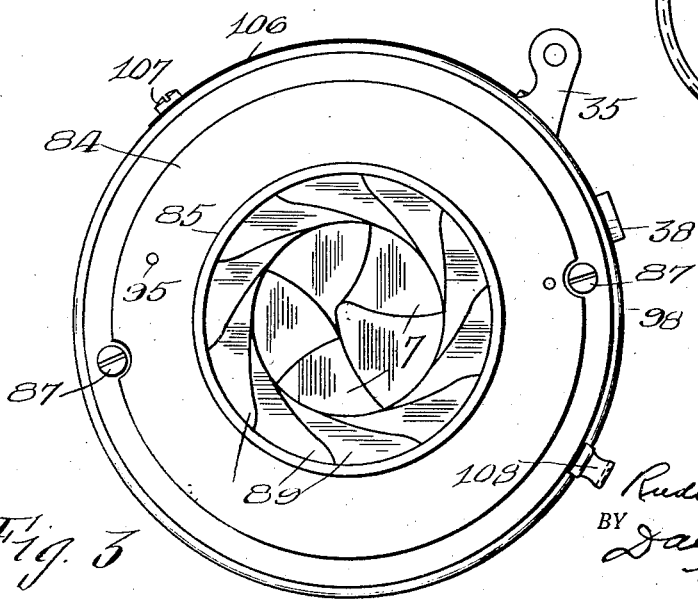
INVENTOR.
Rudolph Klein
BY Davis & Timmis
his ATTORNEYS.

July 24, 1928.
R. KLEIN
PHOTOGRAPHIC SHUTTER
Filed Aug. 11, 1921
1,678,119
5 Sheets-Sheet 2
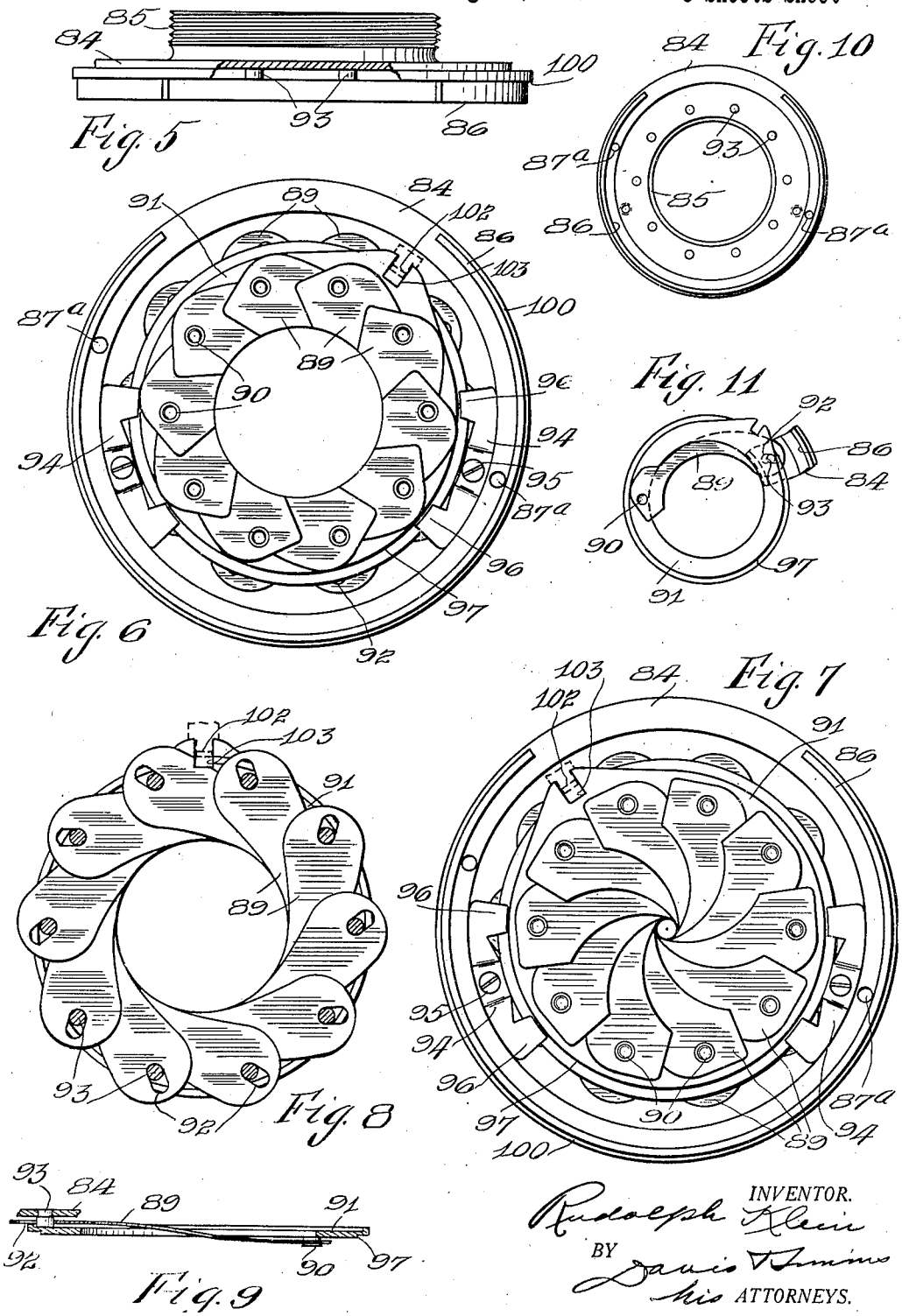
INVENTOR.
Rudolph Klein
BY
ATTORNEYS.

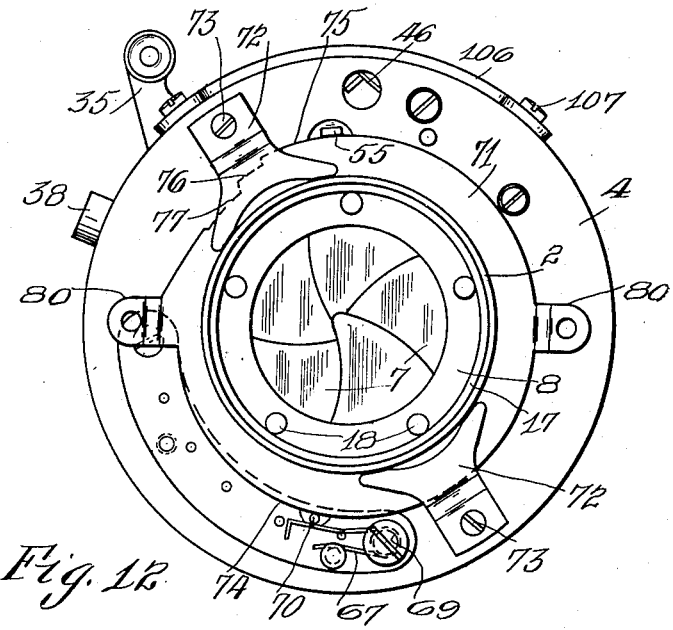
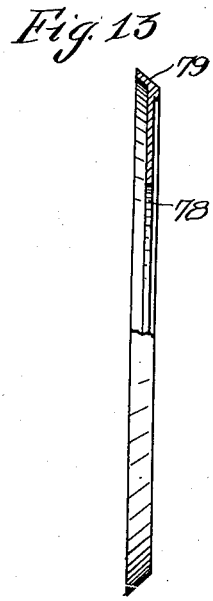
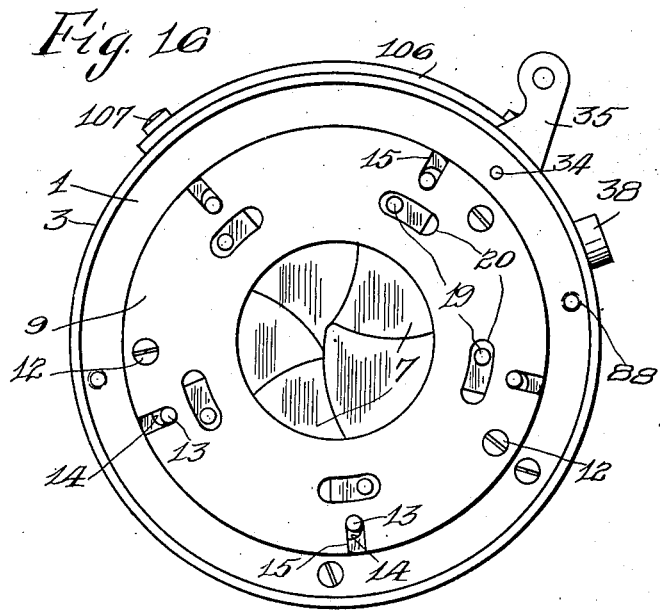
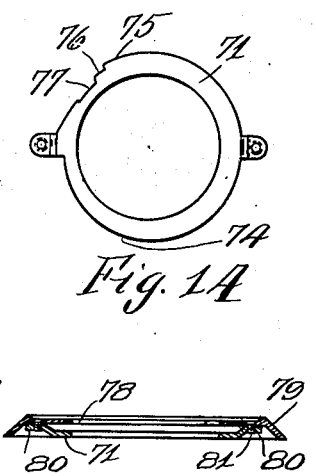
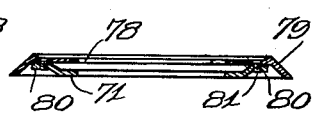
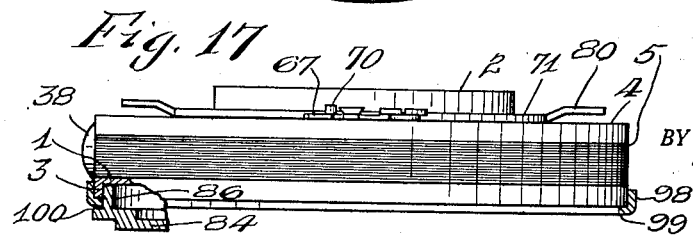

July 24, 1928.
R. KLEIN
1,678,119
PHOTOGRAPHIC SHUTTER
Filed Aug. 11, 1921    5 Sheets-Sheet 4
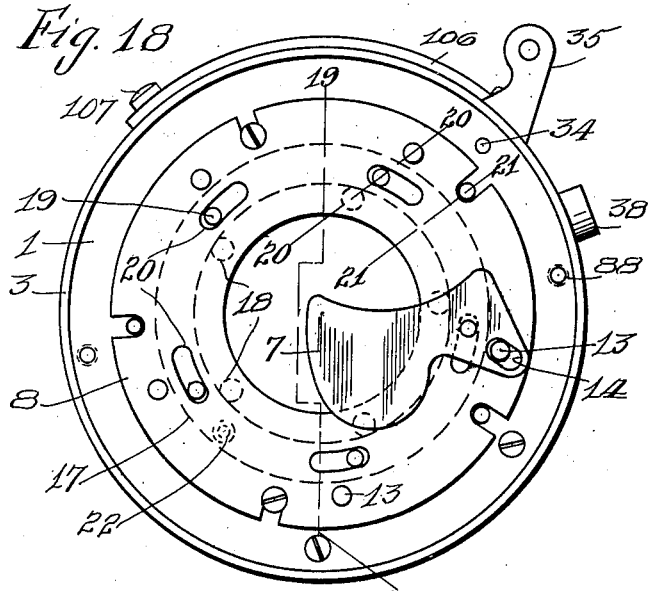
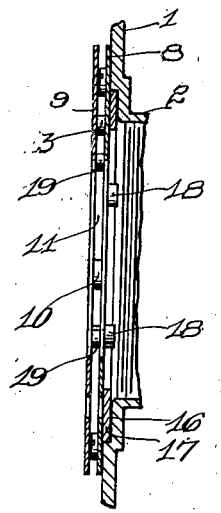
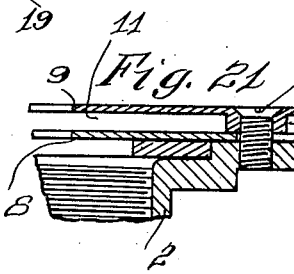
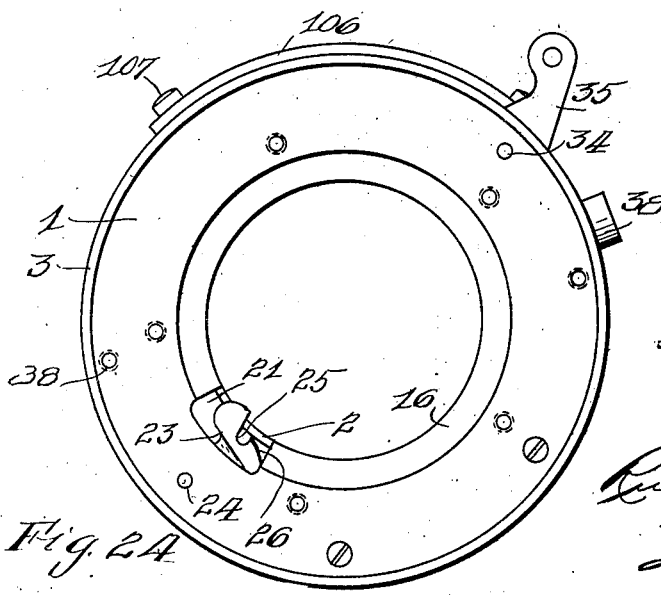
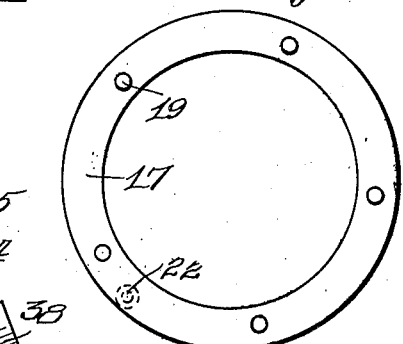

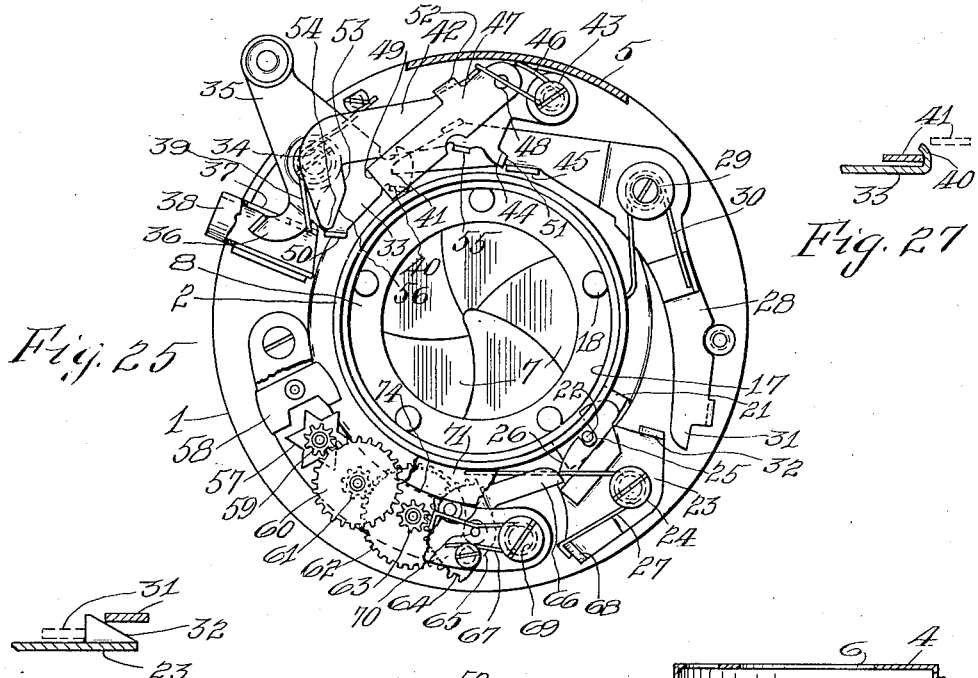
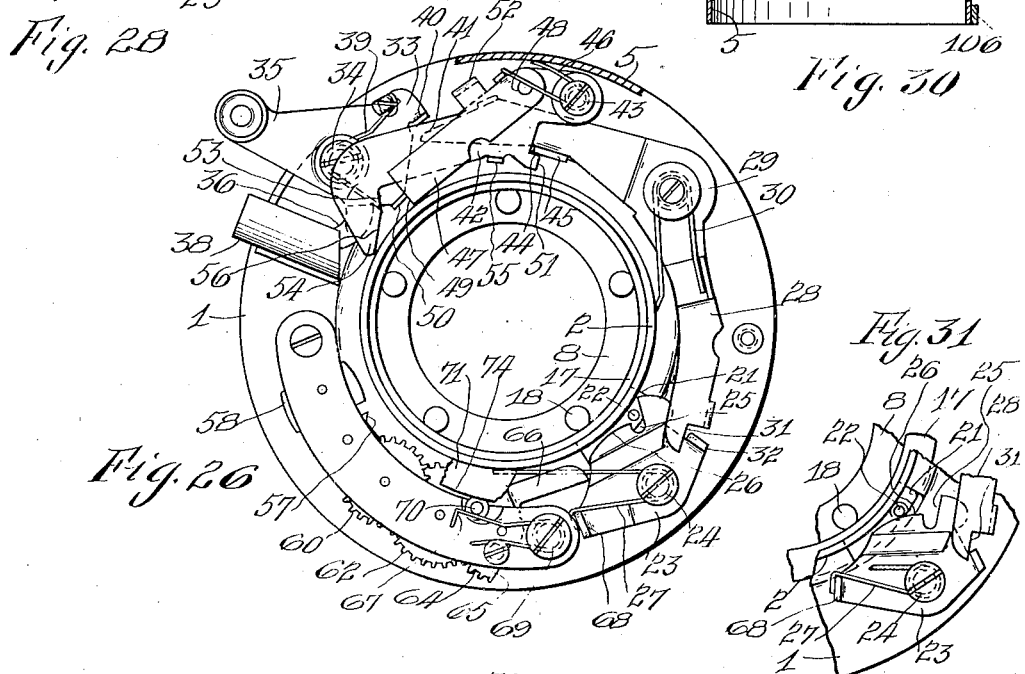
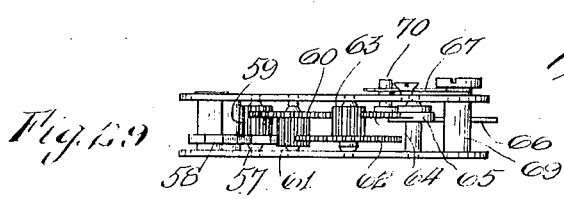

Patented July 24, 1928.

1,678,119

UNITED STATES PATENT OFFICE.

RUDOLPH KLEIN, OF ROCHESTER, NEW YORK, ASSIGNOR TO ILEX OPTICAL COMPANY, OF ROCHESTER, NEW YORK, A CORPORATION OF NEW YORK.

PHOTOGRAPHIC SHUTTER.

Application filed August 11, 1921. Serial No. 491,404.

The present invention relates to photographic shutters, and an object thereof is to provide an improved casing with the shutter blades and a shutter operating mechanism mounted thereon in such manner that these parts may be readily exposed for assembling and adjustment. A further object of the invention is to provide a photographic shutter with a casing part on which the shutter blades are mounted on one side of such part while the operating mechanism is mounted in an exposed condition on the opposite face. A still further object of the invention is to provide an improved mounting for the shutter blades and the exposure ring. A still further object of the invention is to provide an improved manner for connecting the support of the iris diaphragm to the shutter casing. Still another object of the invention is to improve the construction of the iris diaphragm so as to reduce the cost of manufacture thereof. Another and still further object of the invention is to operate the iris diaphragm by a ring from the exterior of the casing. A still further object of the invention is to provide an adjusting ring for the shutter mechanism so formed that the indicating matter thereon may be visible from the front of the shutter or from the periphery of the shutter. Still another object of the invention is to provide a cover member for the front of the casing which will act as an adjusting member for the shutter operating mechanism. Another and still further object of the invention is to provide an exposure member which moves the shutter blades to open and closed positions and is acted on by the master member when moving in one direction, and there being provided a lost motion connection between the exposure member and the shutter blades permitting the master member to move the exposure member after the shutter blades have been opened so that the master member may slip off the exposure member. Still another feature of the invention is the provision of a retarding device which acts through an exposure member on the master member, this exposure member having connection with the shutter blades which moves the latter to open and to closed position, a lost motion being provided which permits the master member and exposure member to move relatively to the shutter blades after the shutter blades have been opened, without permitting the return movement of the shutter blades until the exposure member is released by the master member.

To these and other ends, the invention consists of certain parts and combinations of parts, all of which will be hereinafter described, the novel features being pointed out in the appended claims.

In the drawings:—

Fig. 1 is a top edge view of a shutter constructed in accordance with this invention;

Fig. 2 is a face view of the shutter;

Fig. 3 is a rear view of the shutter;

Fig. 4 is a detail view, partially in a section, of the iris setting ring;

Fig. 5 is an edge view, partially in section, of the back member;

Fig. 6 is an inner face view of the back member showing the iris diaphragm in open position;

Fig. 7 is a similar view showing the iris opening reduced to a minimum size;

Fig. 8 is a detail view, from the under side with reference to Fig. 6, showing the iris operating ring and the blades connected thereto;

Fig. 9 is a sectional view of the iris operating ring showing one of the blades connected thereto;

Fig. 10 is an inner face view in detail of the back member;

Fig. 11 is a detail view showing one iris blade and its connection with the back plate and operating ring;

Fig. 12 is a face view of the shutter with the combined shutter setting ring and cover member removed;

Fig. 13 is a side view, partially in section, of the combined shutter setting ring and cover;

Fig. 14 is a detail view of the controlling ring;

Fig. 15 shows the manner in which the setting ring connects with the controlling ring;

Fig. 16 is a rear face view of the parts seen in Fig. 12 and showing shutter blades after the back member with the iris diaphragm removed;

Fig. 17 is a bottom edge view of the shutter with parts removed and as seen in Figs. 12 and 16;

Fig. 18 is a view similar to Fig. 16 but showing one of the shutter blade retaining plates removed, only one blade being illustrated and this being in closed position;

Fig. 19 is a section on the line 19—19, Fig. 18;

Fig. 20 is an enlarged fragmentary section on the line 20—20, Fig. 18;

Fig. 21 is an enlarged fragmentary section on the line 21—21, Fig. 18;

Fig. 22 is a detail view of the blade operating or exposure ring;

Fig. 23 is an edge view of the blade operating or exposure ring;

Fig. 24 is an interior face view of a casing member showing the shutter blades and blade operating ring removed;

Fig. 25 is a face view of the shutter operating mechanism, the parts being illustrated in the positions they occupy when the shutter blades are closed;

Fig. 26 is a view similar to Fig. 25 showing positions of the parts when the blades are open;

Fig. 27 is a detail view showing the manner in which the actuating lever cooperates with the master lever;

Fig. 28 is a detail view showing the manner in which the master lever cooperates with the exposure lever;

Fig. 29 is an edge view of the retarding mechanism;

Fig. 30 is a sectional view of one of the casing members; and

Fig. 31 shows in detail the cooperation between the exposure lever and the blade operating ring or member to hold the blades in open positions, while the exposure lever is being shifted by the master member.

In the illustrated embodiment of the invention there is provided an improved casing which comprises an annular or ring shaped plate 1 having a flange 2 provided about the circular opening thereof and inwardly threaded to receive one of the lens mountings. This plate also has a rearwardly extending flange 3 forming a chamber in which the shutter blades may be arranged as will be hereinafter more particularly pointed out. The other member of the casing comprises an annular plate 4 with an annular flange 5 the central opening 6 of the plate fitting snugly about the lens flange 2 of the plate 1 and the edge of the flange 5 cooperating with the adjacent face of the plate 1 near the periphery of the latter.

The shutter blades 7 are mounted between two plates 8 and 9, the latter of which has lugs 10 formed thereon to space the plates apart, as at 11, in order to provide a chamber for the blades. A screw 12 passes through the two plates and the lug 10 and is anchored in the member 1 on the rear face of said member. The plate 8 has pins 13 projecting therefrom through slots 14 in the blades 7, while the member 9 has radial slots 15 which fit over said pivot pins 13 in the manner shown in Fig. 16. With the end in view of operating the blades 7, the casing member 1 is provided about its central opening and under said plate 8 with a chamber 16 in which a shutter blade operating ring or exposure member 17 is mounted to turn, the plate 8 having an annular series of bearing pins 18 engaged by the inner periphery of the ring 17 to form a bearing for said ring and guide the latter in its rotary movement. The operating ring 17 has a plurality of pins or projections 19 which engage through openings in the blades 7 so as to transmit motion simultaneously to all of said blades and to cause them to swing on the projections 19 due to the fact that a portion of each blade has a slot connection with one of the stationary pins or projections 13 on the plate 9. Both of the plates 8 and 9 are provided with arcuate slots 20 in which the pins or projections 19 operate. The edge of the flange 3 on the annular plate 1 lies substantially in the plane of the outer face of plate 9 so that when such flange is laid upon a flat surface it will support the mechanism, just above described, without danger of injury to the blades.

The plate 1 is cut away at 21 so that a projection 22 on the ring 17 may extend to the opposite side of the member 1, and with this projection an exposure lever or member 23 pivoted at 24 on the opposite side of the member 1 cooperates. This exposure lever or member 23 is of novel construction and has a lost motion connection with the shutter operating ring or exposure member 17 which permits the exposure lever 23 to move independently of the shutter operating ring 17, after the shutter blades have been opened, so that a retarding mechanism may co-act directly with the exposure lever 23 and retard the closing action of the blades while the latter are in extreme open positions. In this embodiment the exposure lever 23 has a slot 25 and a curved surface 26 concentric with the axis 24. By this arrangement the walls of the slot 25 cooperate with the projection 22 to move the shutter blades toward and from open positions. After open position is reached the exposure lever 23 continues its movement and the projection 22 cooperates with the curved surface 26 so that the shutter blades are held in open positions until the exposure lever 23 is again moved to bring the projection 22 into the slot 25. A spring 27 acts on the exposure lever 23 to move the latter in a direction to effect the closing of the shutter blades.

Movement of the exposure lever in the opposite direction may be effected through a motor or master member 28 which is pivoted at 29 and is moved in one direction under the action of the spring 30. This motor or master member has an end 31 which cooperates with the lateral projection 32 on the exposure lever and shifts the latter against its spring 27, the spring 30 being of greater strength than the spring 27. When the master member travels a certain distance, the end 31 rides out of engagement with or slips off the projection 32 thus permitting the exposure lever 23 to return under the action of its spring 27. When the master member is moved in the opposite direction to compress the spring 30, the end 31 yields by engagement with the projection 32 and rides over said projection 32, in the manner indicated in Fig. 28, so as to engage behind the projection as shown in the dotted lines in Fig. 28.

Movement of the master member may be effected through a setting or actuating lever 33 which is pivoted at 34 to the plate 1 and has an arm 35 extending to the exterior of the shutter casing through which the shutter may be manually operated. This actuating member also has an arm 36 which operates in a slot 37 of a tube 38 secured rigidly to the plate 1 and adapted for connection with the shutter of a flexible operating member such as a bulb or so-called release wire. When the actuating lever is shifted, it compresses a spring 39 which returns the actuating lever to normal position when released. On shifting the actuating lever a projection 40 thereon cooperates with the end 41 of the master member and shifts the master member to store energy in the spring 30. The actuating lever 35 and the master member 28, being mounted on different centers the projection 40 eventually releases the master member and permits the latter to return under the action of its spring 30. When the spring 39 returns the actuating lever the projection 40 on the latter slides under the master lever in the manner indicated in Fig. 27 so as to be in position to re-engage the master member on the next actuation of said actuating lever 33.

Shutters of this type are usually provided with detaining means for cooperating with the master member to hold the shutter blades in open position. This detaining means, in this instance, embodies a detent 42 pivoted at 43 to the plate 1 and having a shoulder 44 which cooperates with a projection 45 on the master member, as illustrated in Fig. 26, for the purpose of holding the shutter blades open. A spring 46 acts on this detent normally to move it toward detaining position. To the end of utilizing the actuating lever 33 for releasing the master member from the detaining member 42, the latter is provided with a latch 47 pivoted at 48 thereon and having the spring 46 acting on it to move it in one direction. The free end 49 of this latch is adapted to be engaged by a projection 50 on the actuating lever 33, when the parts are in the positions, shown in Fig. 26, so as to shift the detent 42 out of the path of the master lever 28. The detent 42 is prevented from returning by the engagement of a face 51 on such detent with the projection 45. In order that the latch 47 will not interfere with the movement of the actuating lever 33 to set and release the master member 28, the master member engages with a projection 52 on the latch and shifts said latch out of the path of the projection 50 on the actuating lever, but when the master lever is released this latch falls down in front of the projection 50, so that it may be shifted by such projection. To the end that the actuating lever 33 will not be returned completely under the action of its spring 39, the detent has a shoulder 53 formed thereon which cooperates with the projection 50 and limits the return movement of the actuating lever. In other words, when the shutter blades are held in open position, the projection 50 lies between the end 49 of the latch and the shoulder 53 on the detent so that when the actuating lever 33 is again shifted against the action of its spring, the projection 50 will shift the detent through the latch 47 and permit the release of the master member from the shoulder 44, the projection 45 then engaging with the shoulder 51 on the detent and holding said detent away from detaining position until the next actuation of the actuating lever 33. The projection 50 on the actuating lever 33 also passes beneath the end 54 of the detent and serves to prevent the return of the detent, as shown in Fig. 25. Should it be desired to give substantially instantaneous action of the shutter blades, the detaining member 42 is held out of action preferably by a controlling means, hereinafter to be described, cooperating with a projection 55 on the detaining member. This controlling means also is utilized for controlling the detent in the manner to give what is known as bulb exposure, that is, an exposure which is timed to correspond to the movement of the actuating lever 33. For this bulb exposure, the detent has a limited movement sufficient to bring the shoulder 44 on the detent in engagement with the projection 45, but the projection 50 is not permitted to engage with the shoulder 53 but merely comes in engagement with an inclined surface 56 on the detent so that when the actuating lever 33 is released, the pressure of the spring 39 of said actuating lever will cause the projection 50 to bear against the inclined surface 56 and shift the detent 42 so as to bring the shoulder 44 out of the path of the projection 45 and permitting the master member to return for the purpose of effecting the closing of the shutter blades.

For varying the time of the so-called instantaneous exposure, a retarding mechanism of any desirable form may be employed. In this instance, this retarding mechanism is in the form of a star wheel 57 with which a vibratory device 58 cooperates. The star wheel has a pinion 59 secured thereto and driven by a gear wheel 60 which turns with a pinion 61, the latter being driven by a gear wheel 62 turning with a pinion 63 which in turn meshes with a segmental gear 64 on an oscillatory member 65. The oscillatory member has an arm or stop 66 and is acted upon by a spring 67 which normally holds said arm toward the stop or projection 68 on the exposure lever 23. The movement of the arm 66 toward the exposure lever 68 is limited by the stop 69, Fig. 29, so that when the shutter blades are closed the stop 68 lies in spaced relation to the stop 66, being in engagement only with the stop 66, while the curved portion 26 on the exposure lever is in cooperation with the pin 22 of the shutter operating ring. It follows, therefore, that the retarding mechanism acts on the exposure lever only after the blades have been moved to open position. In other words, this arrangement provides for a quick opening and a quick closing of the shutter blades, the retarding taking place while the blades are completely open. The amount of the retarding is determined by shifting the stop 66 of the oscillatory member toward and from the stop 68, this being effected by providing a projection 70 on the oscillatory member and controlling the position of the oscillatory member through this projection.

It is preferred to provide a common controlling member for the retarding mechanism and the detaining means. In this instance, this common controlling member is in the form of a ring 71 movably held to the outer face of the casing member 4 (see Fig. 12) by two spring clips 72 secured to the casing member 4 at 73 and overhanging the controlling ring 71. This controlling ring also has bearing on the flange 2 of the casing member 1 that projects through the casing member 4. The periphery of this controlling ring is provided with a curved surface 74 which is eccentric to the axis of turning of the ring and cooperates with the projection 70 on the oscillatory member 65 of the retarding mechanism, this surface shifting the oscillatory member against the action of the spring 67 away from the stop 68 on the exposure lever 23. This controlling ring also has a portion to control the detaining means, this portion comprising a surface 75 which cooperates with the projection 55 to produce so-called instantaneous exposures, a surface 76 for cooperating with the projection 55 to produce the so-called bulb exposures, and a surface 77 for cooperating with the projection 55 to produce the so-called time exposures.

With the end in view of covering the front face of the casing member 4 and at the same time for the setting of the controlling ring or member 71 there is provided a combined covering plate and setting member (see Figs. 1, 2, 13 and 15) which has a center opening 78, the walls of which turn in engagement with the flange 2 of the casing member 1. This cover plate also has a bevelled periphery 79, the outermost edge of which is substantially coincident with the periphery of the casing member 4 against which the cover and setting member abuts. This cover and setting member is held in place so as to turn relatively to the casing member 4 and with the controlling ring 71, and to this end the controlling ring has two diametrically arranged projecting ears 80 with which screws 81 passing through the covering and setting member engage. The bevelled edge of the covering and setting member is provided with indicating matter 82 for indicating the different exposures and on the periphery of the casing member 4 an index or pointer 83 is provided for cooperation with the indicating matter 82 in order to determine the different positions of the setting member.

The back member of the shutter acts as a support for the iris diaphragm and comprises an annular member 84 having a central rearwardly extending flange 85 exteriorly threaded to permit the attachment to a suitable support and internally threaded for the reception of the mounting of a lens element, there being provided on the face opposite the annular flange 85 an annular flange 86 which is received within the flange 3 of the member 1, the back member being held to the member 1 by screws 87 passed through the openings 87ª and anchored in the member 1 at 88. The iris diaphragm, which is supported upon the back member 84, comprises a plurality of blades 89 pivoted at 90 to an operating ring 91, extending through such ring and provided at their opposite ends with slots 92 which fit over pivot pins or projections 93 arranged in an annular series on the inner face of the back member, the operating ring being held in place over the pins 93 by spring clips 94 which are secured by screws 95 to the back member beyond the periphery of the operating ring and have each a pair of fingers 96 holding the ring in a set position. The ring has an annular guide 97 on one face with which the ends of the fingers engage to guide the ring in a circular path.

The operation of the iris diaphragm may be effected from the exterior of the shutter through a setting member which is, in this instance, in the form of a ring 98 having an inwardly projecting flange 99 lying between an annular shoulder 100 on the back plate about the flange 86 and the edge of the flange 3 on the member 1 of the casing, this ring having an inwardly projecting tongue 101 which has an end 102 operating in a notch 103 in the operating ring 91, so that when the setting ring 98 is turned it will transmit its motion to the controlling ring 91 and thus impart a movement to the iris blades. This setting ring has an index mark 104 on the outer face thereof for cooperating with the indicating matter 105 arranged on a plate 106 which is secured by screws 107 to the periphery of the casing member 4.

The iris diaphragm is controlled by the setting ring 98, operable through the finger piece 108 from the exterior of the casing, and by causing the index 104 to cooperate with the indicating matter 105. By having the indicating matter 105 and the index 83 on the periphery of the casing and preferably at the top, it is possible to view the adjustment of both the iris diaphragm and the shutter mechanism simultaneously. The indicating matter being arranged on the bevelled surface of an annular setting member, it is possible to read the same both from the front of the lens and also from the side of the lens. The setting members of the shutter mechanism and the iris diaphragm are both of annular form and have an extended bearing on the shutter so that they are not liable to become broken or get out of order. The iris diaphragm is mounted entirely upon the back member and may be completely assembled on the back member while the latter is detached from the other portions of the shutter.

A shutter casing is provided having two parts one of which has the shutter blades mounted on one side thereof and the shutter operating mechanism mounted on the opposite side, thus permitting the complete assembling of the shutter blades and the operating mechanism independently of the other casing member. The sides of the shutter operating mechanism are exposed so that they may be readily manipulated, the other casing member carrying a flange which acts as an inclosure for such sides. The controlling member for the detaining means and the retarding mechanism is mounted on a casing member separate from that which carries the shutter operating mechanism and retarder. The shutter blades are held by two plates and may thus be assembled independently of the back member, being on the outermost face of the casing so that they may be repaired without opening the casing. The exposure member or lever has a movement independent of the exposure ring so that it may be shifted by the master member after the shutter blades have been opened to effect connection with the retarding mechanism. The retarding mechanism connects with the master member through an exposure member which has a lost motion connection with the shutter blades and moves the blades to open and to closed position.

What I claim as my invention and desire to secure by Letters Patent is:—

1. In a photographic shutter, a casing embodying two members, one of which is in the form of an annular plate provided with a peripheral flange extended in one direction to provide a chamber for the reception of the shutter blades and provided also with a flange extended in the other direction about the opening in the annular plate to provide a lens tube, and the other member of the casing being in the form of a circular plate fitting over the lens tube and having an annular peripheral flange cooperating with the first named member, shutter blades mounted in the chamber formed by the peripheral flange on the first named member, and shutter operating mechanism mounted between the members.

2. In a photographic shutter, a casing embodying two members, one of which is in the form of an annular plate provided with a peripheral flange extended in one direction to provide a chamber for the reception of the shutter blades and provided also with a flange extended in the other direction about the opening in the annular plate to provide a lens tube, and the other member of the casing being in the form of a circular plate fitting over the lens tube and having an annular peripheral flange cooperating with the first named member, shutter blades mounted in the chamber formed by the peripheral flange on the first named member, shutter operating mechanism mounted between the members, and an iris diaphragm supporting member cooperating with the peripheral flange on the first named member to close the chamber formed by said peripheral flange.

3. In a photographic shutter, a casing embodying two members, one of which is in the form of a plate and is provided with a peripheral flange extended in one direction and with an annular flange extended in the other direction about the central opening, and the other of which is in the form of an annular member fitting over the last mentioned flange and having a peripheral flange cooperating with the first named member, shutter blades arranged in the chamber formed by the peripheral flange on the first named member, shutter operating mechanism arranged in the chamber between the two members, and a controlling member for the shutter opening mechanism arranged to turn on the annular flange of the first named member on the exterior of the second named member.

4. In a photographic shutter, a casing embodying two members, one of which is in the form of a plate and is provided with a peripheral flange extended in one direction and with an annular flange extended in the other direction about the central opening, and the other of which is in the form of an annular member fitting over the last mentioned flange and having a peripheral flange cooperating with the first named member, shutter blades arranged in the chamber formed by the peripheral flange on the first named member, shutter operating mechanism arranged in the chamber between the two members, a controlling member for the shutter operating mechanism arranged to turn on the annular flange of the first named member on the exterior of the second named member, and a cover plate fitting about said annular flange and the controlling member.

5. In a photographic shutter, a casing embodying two members, one of which is in the form of a plate and the other of which has an annular flange projected therefrom to form a chamber between the two members, shutter blades supported on the outer side of the plate member, and shutter operating mechanism supported on the inner side of the plate member so that when the other member is removed, the plate member will have the shutter blades and the operating mechanism supported thereon and both exposed for adjustment.

6. In a photographic shutter, an annular plate having on one side an annular depression about its opening, an exposure ring arranged in said depression, two annular plates secured in spaced relation over said exposure ring, and shutter blades operable between the plates and connected to said exposure ring.

7. In a photographic shutter, a casing embodying an annular plate formed on one side with a peripheral flange and on the other side with an annular flange about its opening to provide a lens tube, the side of the plate being provided with a peripheral flange having an annular depression about the central opening, an exposure ring mounted in said depression, two annular plates supported in spaced relation on the first mentioned annular plate over the exposure ring, shutter blades arranged between the last two mentioned annular plates and connected to the exposure ring to be operated thereby, and shutter operating mechanism supported on the side of the first mentioned annular plate from which the lens tube projects, said shutter operating mechanism being connected to the exposure ring.

8. In a photographic shutter, a casing member provided with a peripheral flange, shutter blades mounted on said casing member within said peripheral flange, an iris diaphragm support provided with a peripheral flange received within the peripheral flange of the casing member, and an iris diaphragm mounted on the support within the peripheral flange of the latter.

9. In a photographic shutter, a shutter casing, shutter blades mounted thereon, an iris diaphragm support, an iris diaphragm arranged on that face of the support disposed toward the shutter casing, an adjusting ring exposed exteriorly of the casing and the support and having a guiding portion extending between the support and the casing by which said ring is held in operative position on the shutter, and a connection between the ring and the iris diaphragm whereby the latter may be operated through the ring.

10. In a photographic shutter, a shutter casing, an iris diaphragm support, a peripheral flange extending from one of said parts and having an abutment against the other to provide a chamber between the parts, an iris diaphragm mounted on the support within the chamber, and an adjusting ring exposed exteriorly of the casing and of the support and having a portion projecting therefrom between the casing and the support by which the ring is held in operative position on the shutter and turning on the exterior of the peripheral flange, said adjusting ring having connection with the iris diaphragm to adjust the latter.

11. The combination with a shutter casing, of an iris diaphragm support having a peripheral flange on one side cooperating with the shutter casing to form a chamber, an operating ring arranged in said chamber, iris blades connected to said operating ring and to the support, and an adjusting ring mounted to turn on said flange and connected with said operating ring, such connection embodying a recessed portion on the operating ring and an arm extended inwardly from the adjusting ring and having a portion lying in said recess.

12. In a photographic shutter, a shutter casing having a peripheral flange, an iris diaphragm support having a peripheral flange of greater depth than the peripheral flange on the shutter casing and received within said peripheral flange of the shutter casing, a controlling ring arranged on the iris diaphragm support within the peripheral flange, iris blades connected to the controlling ring and to the support, and an adjusting ring operating on the peripheral flange of the iris support and connected with said iris controlling ring.

13. In a photographic shutter, a shutter casing embodying two members forming a chamber between them, shutter blades arranged on the outside of one of said members, shutter operating mechanism arranged between the members, a lens tube secured to the member carrying the shutter blades and extending through the other member, and a controlling ring for the shutter operating mechanism mounted to turn on said lens tube on the exterior of the member through which the tube projects.

14. In a photographic shutter, a shutter casing embodying two members forming a chamber between them, shutter blades arranged on the outside of one of said members, shutter operating mechanism arranged between the members, a lens tube secured to the member carrying the shutter blades and extending through the other member, a controlling ring for the shutter operating mechanism mounted to turn on said lens tube on the exterior of the member through which the tube projects, and a cover plate secured over said controlling ring and the member through which the lens tube projects.

15. In a photographic shutter, a casing embodying two members, shutter blades and shutter operating mechanism mounted on one of said members, a lens tube projecting from said member through the other member, a controlling ring arranged on the exterior of said other member about the lens tube, and a cover plate secured over said controlling ring and the said other member.

16. In a photographic shutter, a casing, shutter blades on the casing, a shutter mechanism, and a rotary adjusting member mounted to turn on the front of the casing about an axis coincident with the optical axis of the shutter, said rotary adjusting member having a bevelled edge, the outermost periphery of which is substantially coincident with the cylindrical wall of the casing, and indicating means on the cylindrical wall and the bevelled edge for indicating different adjustments of the shutter mechanism, the indicating means on both parts being simultaneously visible from a point directly above the shutter so that the adjustment may be viewed by one standing in rear of the shutter.

17. A photographic shutter comprising shutter blades, a master member, an exposure member connected to the shutter blades and moving in one direction to open the blades and in the other direction to close the blades, a second exposure member operated in one direction by the master member and having a lost motion connection with the first mentioned exposure member to permit the movement of the second member under the action of the master member after the blades have been opened and hold the first mentioned exposure member against return movement during such continued movement of the second exposure member under the action of the master member.

18. In a photographic shutter, shutter blades, a master member, an exposure ring connected with the shutter blades to effect their opening and closing, an exposure lever having a connection with the exposure ring to effect the movement of the latter in both directions, said connection being constructed to permit the exposure lever to continue its motion under the action of the master member after the shutter blades have been opened and to hold the exposure ring against return movement until the return movement of the exposure lever.

19. In a photographic shutter, shutter blades, an exposure ring connected to the shutter blades to effect their opening and closing movements, a pivoted exposure lever formed with two surfaces, one of which effects the shifting of the exposure ring in one direction and the other of which effects the shifting of the exposure ring in the other direction, said exposure lever also having a surface concentric with the axis of turning of the exposure lever with which the engaging portion on the exposure ring cooperates after the shutter blades have been opened, and a master member movable in one direction without effecting the operation of the exposure lever and in the other direction to effect the operation of the exposure lever to open the blades and thereafter to hold the blades open until the exposure lever has been released by the master lever.

20. In a photographic shutter, shutter blades, an exposure member movable in one direction to open the blades and in the other direction to close the blades, a master member movable in two directions, a second exposure member movable by the master member in one direction when the latter is moved in one direction and unaffected by the master member when the latter is moved in the other direction, said second exposure member having a connection with the first mentioned exposure member which shifts said first exposure member in both directions, such connection permitting the independent movement of the second mentioned exposure member under the action of the master member after the shutter blades have been opened, while holding the first mentioned exposure member against return until the return movement of the second mentioned exposure member.

21. A photographic shutter comprising shutter blades, an exposure ring connected to the shutter blades to move them to open and to closed position, an exposure lever having two surfaces, one of which effects the movement of the exposure ring in one direction and the other of which effects the movement of the exposure ring in the other direction, said exposure lever having a surface concentric with the axis of turning of the exposure lever with which a portion of the exposure ring cooperates after the exposure lever has been shifted to shift the exposure ring to open the blades, a master member movable in one direction without effecting the operation of the exposure lever and in the other direction to shift the exposure lever to a position to open the blades and thereafter hold the blades open until the exposure lever is released by the master lever, and a retarding mechanism acting on said master member through said exposure lever.

22. In a photographic shutter, a casing, an adjusting member mounted to turn in the casing about an axis coincident with the optical axis of the shutter, a bevelled portion carried by one of said elements at the front of the shutter, a shutter mechanism controlled by said adjusting member, and indicating means for the adjusting member, part of which is provided on the bevelled portion, and part of which is carried by another part of the shutter between which and the bevelled part a relative movement takes place, both parts of the indicating means being viewable for the adjustment of the shutter from a point directly above such shutter.

23. A photographic shutter comprising a blade mechanism, a master member, an exposure lever moved in one direction by the master member, a spring for moving the exposure lever in the other direction, a lost motion connection between the exposure lever and the blade mechanism for moving the blade mechanism to open the shutter when the master member shifts the exposure lever and to close the shutter when the spring shifts such exposure lever, said lost motion connection having an inactive period during the latter part of the movement of the exposure lever under the action of the master member and the first part of the movement of the exposure lever under the action of the spring, and means moving with the exposure lever for cooperating with the blade mechanism to hold the shutter open during the inactive period of the lost motion connection between the exposure lever and the blade mechanism.

24. A photographic shutter comprising a blade mechanism, a master member, an exposure lever moved in one direction by the master member, a spring for moving the exposure lever in the other direction, a lost motion connection between the exposure lever and the blade mechanism for moving the blade mechanism to open the shutter when the master member shifts the exposure lever and to close the shutter when the spring shifts such exposure lever, said lost motion connection having an inactive period during the latter part of the movement of the exposure lever under the action of the master member and the first part of the movement of the exposure lever under the action of the spring, and means moving with the exposure lever for cooperating with the blade mechanism to hold the shutter open during the inactive period of the lost motion connection between the exposure lever and the blade mechanism, said means comprising a surface on the exposure lever concentric with the axis of turning of the latter and means moving with the blade mechanism for cooperating with said surface.

25. A photographic shutter comprising a blade mechanism, a master member, an exposure lever moved in one direction by the master member, a spring for moving the exposure lever in the other direction, a lost motion connection between the exposure lever and the blade mechanism for moving the blade mechanism to open the shutter when the master member shifts the exposure lever and to close the shutter when the spring shifts such exposure lever, said lost motion connection having an inactive period during the latter part of the movement of the exposure lever under the action of the master member and the first part of the movement of the exposure member under the action of the spring, and means moving with the exposure lever for cooperating with the blade mechanism to hold the shutter open during the inactive period of the lost motion connection between the exposure member and the blade mechanism, a retarding mechanism, and a direct lost motion connection between the retarding mechanism and the exposure lever having an active period during the inactive period of the lost motion connection between the exposure lever and the blade mechanism and two inactive periods, one during the movement of the blade mechanism toward open position and the other during the movement of the blade mechanism toward closed position.

RUDOLPH KLEIN.